(12) United States Patent
Molina Cabrera et al.

(10) Patent No.: US 11,531,347 B2
(45) Date of Patent: Dec. 20, 2022

(54) SYSTEM AND METHOD TO VIRTUALLY TEACH A SEMI-AUTONOMOUS DEVICE

(71) Applicant: Avidbots Corp, Kitchener (CA)

(72) Inventors: Pablo Roberto Molina Cabrera, Waterloo (CA); Thomas Joseph Duchesne, Kitchener (CA); Ronald Scotte Zinn, Kitchenre (CA)

(73) Assignee: Avidbots Corp, Kitchener (CA)

( * ) Notice: Subject to any disclaimer, the term of this patent is extended or adjusted under 35 U.S.C. 154(b) by 274 days.

(21) Appl. No.: 17/023,862

(22) Filed: Sep. 17, 2020

(65) Prior Publication Data

US 2021/0080964 A1 Mar. 18, 2021

Related U.S. Application Data

(60) Provisional application No. 62/901,280, filed on Sep. 17, 2019.

(51) Int. Cl.
*G05D 1/02* (2020.01)
*G06F 3/0484* (2022.01)
(Continued)

(52) U.S. Cl.
CPC ......... *G05D 1/0219* (2013.01); *G01C 21/206* (2013.01); *G01C 21/3837* (2020.08);
(Continued)

(58) Field of Classification Search
CPC .. G05D 1/0219; G05D 1/0016; G05D 1/0044; G05D 1/0221; G05D 1/0274; G05D 2201/0203; G01C 21/206; G01C 21/3837; G01C 21/3841; G06F 3/0484; G06F 9/452; G06F 16/29; G06F 8/34; G06N 20/00; A47L 9/2805; A47L 9/2852; A47L 2201/04; A47L 11/4011; A47L 11/4061; A47L 13/50
(Continued)

(56) References Cited

U.S. PATENT DOCUMENTS 10,062,354 B2 * 8/2018 Dutt ................. G06F 9/455
2016/0291596 A1 * 10/2016 Ebrahimi Afrouzi ...................... G05D 1/0234

(Continued)

FOREIGN PATENT DOCUMENTS

DE 102016100428 A1 * 7/2016 ........... G05D 1/0221

*Primary Examiner* — Muhammad Shafi (57) ABSTRACT

A virtual teaching system includes a semi-autonomous device to perform a task such as cleaning a target environment. The semi-autonomous device includes one or more sensors configured to record environmental data from the target environment that can be used to construct a virtual environment. The semi-autonomous device is operably coupled to an analysis system. The analysis system includes a processor to perform multiple functions, such as constructing the virtual environment from the recorded environmental data and supporting operation of a user interface. The user interface can be operably coupled to the processor, allowing a human operator to teach a virtual device in the virtual environment to perform an action sequence. Once the virtual device has been taught an action sequence in the virtual environment, the analysis system can transfer the recorded action sequence to the semi-autonomous device for use in the target environment.

18 Claims, 8 Drawing Sheets

(51) Int. Cl.
   *G06F 9/451* (2018.01)
   *G06F 16/29* (2019.01)
   *G06N 20/00* (2019.01)
   *G01C 21/00* (2006.01)
   *G01C 21/20* (2006.01)
   *G05D 1/00* (2006.01)

(52) U.S. Cl.
   CPC ....... *G01C 21/3841* (2020.08); *G05D 1/0016* (2013.01); *G05D 1/0044* (2013.01); *G05D 1/0221* (2013.01); *G06F 3/0484* (2013.01); *G06F 9/452* (2018.02); *G06F 16/29* (2019.01); *G06N 20/00* (2019.01)

(58) Field of Classification Search
   USPC .......................................................... 701/27
   See application file for complete search history.

(56) References Cited

U.S. PATENT DOCUMENTS

2016/0293133 A1\* 10/2016 Dutt .......................... G06F 8/20
2016/0309973 A1\* 10/2016 Sheikh ................ A47L 11/4044
2019/0130878 A1\* 5/2019 Bradley ................ B60W 50/14
2019/0196457 A1\* 6/2019 Krautwurm ............ B25J 9/1676

\* cited by examiner

SYSTEM AND METHOD TO VIRTUALLY TEACH A SEMI-AUTONOMOUS DEVICE

CROSS REFERENCE TO RELATED APPLICATIONS

The application claims priority and the benefit of U.S. Provisional Patent Application Ser. No. 62/901,280, entitled "A SYSTEM AND METHOD TO VIRTUALLY TEACH A SEMI-AUTONOMOUS DEVICE", filed on Sep. 17, 2019 which is herein incorporated by reference.

BACKGROUND

Embodiments described herein relate to a system and method to virtually teach a semi-autonomous device. Semi-autonomous devices can be used to perform labor intensive tasks conventionally performed by humans. Before performing a task in a target environment, the semi-autonomous device is generally first taught to navigate the target environment by a skilled human operator in order to ensure the task can be performed efficiently and safely. Typically, the skilled human operator physically pilots the semi-autonomous device. While the semi-autonomous device is guided through the environment, the path of the semi-autonomous device is recorded. The semi-autonomous device can then follow the recorded path during operation. However, this approach to teaching the semi-autonomous device can be time consuming and labor intensive. In particular, if the semi-autonomous device exhibits an error or an undesirable behavior, one or more portions of the recorded path should be rerecorded. Additionally, the human operator should have sufficient expertise to teach the semi-autonomous device how to navigate the environment, which can add additional cost.

SUMMARY

Embodiments described herein relate to a system and method to virtually teach a semi-autonomous device. A virtual teaching system includes a semi-autonomous device to perform a task such as cleaning a target environment. The semi-autonomous device includes one or more sensors configured to record environmental data from the target environment that can be used to construct a virtual environment. The semi-autonomous device is operably coupled to an analysis system. The analysis system includes a processor to perform multiple functions, such as constructing the virtual environment from the recorded environmental data and supporting operation of a user interface. The user interface can be operably coupled to the processor, allowing a human operator to teach a virtual device in the virtual environment to perform an action sequence. Once the virtual device has been taught the action sequence in the virtual environment, the analysis system can transfer the action sequence to the semi-autonomous device for use in the target environment.

DETAILED DESCRIPTION

Semi-autonomous devices can be used to perform labor intensive tasks conventionally performed by humans. For example, a floor cleaning robot can clean a building more thoroughly and reliably than a human operator while reducing the time, cost, and labor for cleaning. Before performing a task in a target environment, the semi-autonomous device is generally first taught to navigate through the target environment in order to ensure the task can be performed efficiently and safely. For conventional semi-autonomous devices, such as a floor cleaning robot, teaching is accomplished by a skilled human operator who physically pilots the semi-autonomous device through the target environment. As the semi-autonomous device is guided through the environment, an action sequence, (e.g., the path taken by the semi-autonomous device) is recorded. The semi-autonomous device can then follow the recorded action sequence during operation in the target environment.

However, the process of teaching the semi-autonomous device can be time consuming and labor intensive, especially when the semi-autonomous device performs a task in a large environment. For instance, when teaching the semi-autonomous device an action sequence, the human operator may need to rerecord one or more portions of the action sequence if the semi-autonomous device exhibits an error or an undesirable behavior during operation when performing the task. Additionally, the human operator should have sufficient training and expertise to teach the semi-autonomous device the desired action sequence, which can lead to higher costs and reduce productivity, particularly if the human operator trains multiple semi-autonomous devices that each perform a task in the target environment. Therefore, it is desirable to have a system and method capable of teaching the semi-autonomous device to perform an action sequence that can be more easily recorded, rerecorded, edited, and/or tested by a human operator.

The present disclosure is thus directed towards a system and method to virtually teach a semi-autonomous device to perform an action sequence in a target environment. In some embodiments, the semi-autonomous device can be a floor cleaning robot as described in U.S. Patent Publication No. 2016/0309973 entitled, "Apparatus and Methods for Semi-Autonomous Cleaning of Surfaces", filed on Apr. 25, 2016 ("the '973 Publication"), the disclosure of which is incorporated herein by reference in its entirety. The virtual teaching system can utilize environmental mapping data recorded by sensors on the semi-autonomous device to construct a virtual representation of the target environment (also referred to herein as "virtual environment"). A human operator can then teach a virtual representation of the semi-autonomous device (also referred to herein as "virtual device") to perform an action sequence in the virtual environment via a user interface. The user interface allows the human operator to record, rerecord, and edit any portion of the action sequence used by the semi-autonomous device. Heuristic data, such as safety margins, can also be incorporated to augment the teaching process. Additionally, the human operator can slow down or speed up time when testing the virtual device to better analyze errors and undesirable behavior and to reduce the overall amount time to test the virtual device. Once the virtual device is taught an action sequence in the virtual environment, the recorded action sequence can be transferred to the semi-autonomous device for use in the target environment.

Figure 1:
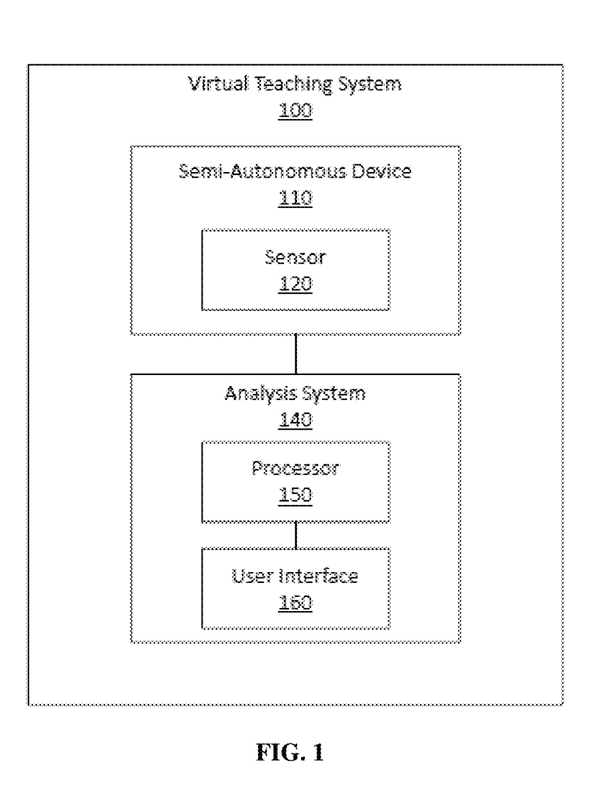
FIG. 1 is a schematic illustration of a virtual teaching system, according to an embodiment.

FIG. 1 shows an exemplary embodiment of a virtual teaching system 100. The virtual teaching system 100 can include a semi-autonomous device 110 with one or more sensors 120 configured to record environmental data from a target environment (not shown). The semi-autonomous device 110 can be operably coupled to an analysis system 140. The analysis system 140 can include a processor 150 to perform multiple functions, such as constructing a virtual environment (not shown) from the recorded environmental data and supporting the use of a user interface 160. The user interface 160 can be operably coupled to the processor 150, allowing a human operator to teach a virtual device an action sequence in the virtual environment. Once the virtual device has been taught the action sequence, the analysis system 140 can transfer the recorded action sequence to the semi-autonomous device 110.

The action sequence performed by the semi-autonomous device 110 can vary depending on the intended function of the semi-autonomous device 110. For example, the desired action sequence for a floor cleaning robot can be a sequence of maneuvers that allow the semi-autonomous device to navigate and move across a substantial portion of the floor in a target environment. The virtual teaching system 100 can be used to teach the semi-autonomous device 110 in various types of indoor and outdoor environments including, but not limited to residential spaces, offices, shopping malls, schools, warehouses, sporting arenas, roadways, sidewalks, and parks. The semi-autonomous device 110 can be various types of devices capable of navigating an environment in an autonomous or semi-autonomous manner including, but not limited to land-based, air-based, and water-based devices. For example, the semi-autonomous device 110 can be a land-based device that has motion systems based on wheels, tracks, treads, or one or more extremities (e.g., bipedal, quadrupedal). In another example, the semi-autonomous device 110 can be an air-based device based rotary systems (e.g., helicopter drones) and turbine systems (e.g., unmanned aerial vehicles).

The semi-autonomous device 110 can include one or more sensors 120 that can detect boundaries and/or obstacles in the target environment. The one or more sensors 120 can be various types of proximity, motion, and image sensors including, but not limited to sonic ranging sensors, visible or infrared (IR) laser ranging sensors, visible/IR cameras, and visible/IR proximity sensors. In some embodiments, the one or more sensors 120 can be disposed onto the semi-autonomous device 110 such that the field of view of the one or more sensors 120 substantially covers the periphery of the semi-autonomous device 110. The one or more sensors 120 can also have sufficient spatial resolution appropriate for the task being performed, which can vary based on the requirements of the task as well as the size, velocity, and maneuverability of the semi-autonomous device 110. Additionally, the semi-autonomous device 110 can include a localization system (not shown) to track the location of the semi-autonomous device 110 within the target environment. For example, the localization system for a floor cleaning robot can be based on odometry data from the motion system, a laser map alignment system that compares laser range data to previously mapped obstacles in the environment, predictive kinematic models based on the trajectory of the semi-autonomous device 110, and/or bimodal distribution checks. The one or more sensors 120 in combination with the localization system can thus record the location of boundaries and/or obstacles in the environment as a function of the location and the heading of the semi-autonomous device 110.

The analysis system 140 can include the processor 150, which provides several functions in the virtual teaching system 100 such as generating the virtual environment, providing processing and rendering support for the user interface 160, and managing transfer of data between the analysis system 140 and the semi-autonomous device 110. The processor 150 can include, but is not limited to one or more central processing units (CPUs), one or more graphics processing units (GPUs), and any combinations thereof. The processor 150 can be operably coupled to various types of storage media including, but not limited to a hard disk drive, a solid state drive, flash memory, a server coupled to the processor 150 via a network connection, and a cloud-based storage system. The processor 150 can be disposed in various form factors including, but not limited to a personal desktop computer, a workstation, a laptop, a tablet, a smartphone, and distributed computing systems.

The processor 150 can also be coupled a display system to facilitate interaction between the human operator and the user interface 160. The display system can include one or more computer monitors, television screens, and/or projection systems. In some embodiments, the display system can also include support for an augmented reality (AR) system or a virtual reality (VR) system to improve ease of use when teaching the virtual device in the virtual environment. The user interface 160 can include various mechanisms of user machine interaction including, but not limited to, touch screens, mouse and keyboard, and motion capture.

A data transfer system (not shown) can also be included to facilitate the transfer of data between the semi-autonomous device 110 and the analysis system 140. The data transfer system can include a physical wire connection between the semi-autonomous device 110 and the analysis system 140 such as an Ethernet cable, a universal serial bus (USB) cable, or a general purpose interface bus (GPIB) cable. The data transfer system can also be a wireless system such as WiFi or Bluetooth. WiFi systems can also leverage available network routers in the target environment to facilitate data transfer over longer distances. In some embodiments, the virtual teaching system 100 can support a combination of wired and wireless connections for greater flexibility.

Figure 2:
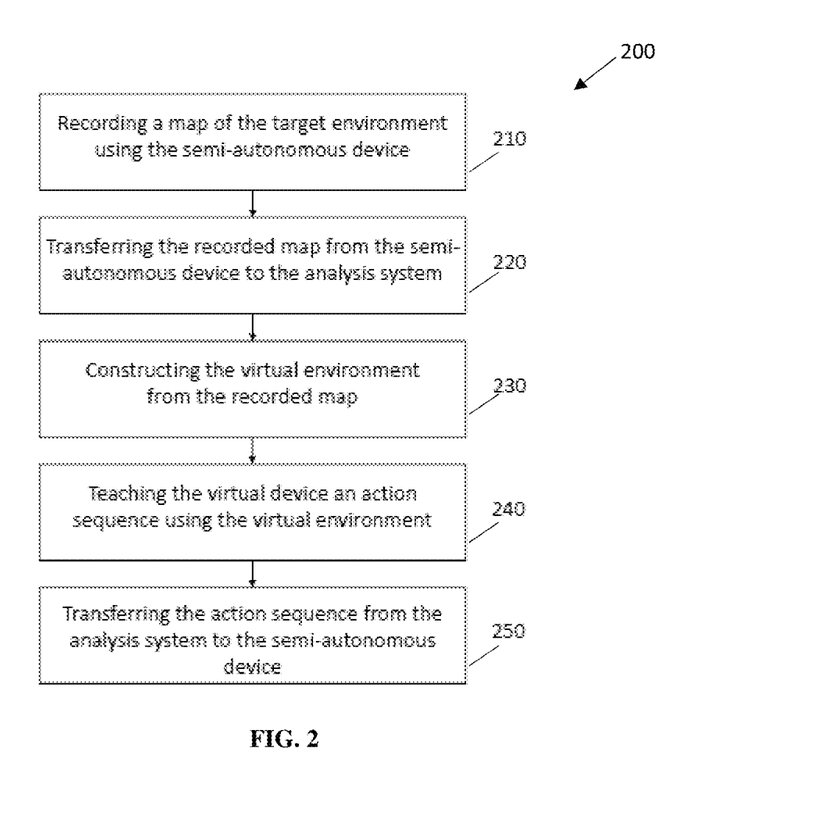
FIG. 2 is a flow chart of a method for teaching a semi-autonomous device an action sequence using a virtual teaching system, according to an embodiment.

A method of teaching a semi-autonomous device using a virtual teaching system will now be described. The virtual teaching system and the components contained therein, including the semi-autonomous device and the analysis system, can be substantially similar in form and/or function to the virtual teaching system 100 described above with respect to FIG. 1. As shown in FIG. 2, an exemplary method of teaching the semi-autonomous device using the virtual teaching system can include the following steps: (1) recording a map of the target environment 210, (2) transferring the recorded map of the target environment from the semi-autonomous device to the analysis system 220, (3) constructing a virtual environment 230, (4) teaching the semi-autonomous device an action sequence using the virtual environment 240, and (5) transferring the action sequence from the analysis system to the semi-autonomous device 250.

In some embodiments, the process of recording a map of the target environment 210 can be accomplished by using the one or more sensors disposed on the semi-autonomous device to detect and record the locations of walls, obstacles, and/or other environmental features (collectively referred to herein as "boundaries"). Additionally, other sensory data from the semi-autonomous device, e.g., sensors used for localization monitoring, can also be recorded. For example, the semi-autonomous device can be guided through the target environment, during which the sensors can be used to record the location of boundaries as a function of the location and heading of the semi-autonomous device within the environment. The data collected during this mapping process can then be passed onto the analysis system for use in the generation of the virtual environment. In some embodiments, the semi-autonomous device can be controlled physically or remotely by a human operator. Compared to conventional methods of teaching a semi-autonomous device described above, the process of mapping the target environment 210 can be simpler to perform. The semi-autonomous device can be guided through a smaller portion of the target environment based on the operable range of the sensors. The semi-autonomous device can also be guided through the target environment using fewer maneuvers. Thus, the human operator does not need as much skill or expertise to map the target environment compared to physically teaching the semi-autonomous device to navigate the target environment.

In some embodiments, the semi-autonomous device can be configured to map the target environment in an automated manner. For example, the sensors can be used to detect the locations of one or more boundaries in the target environment and the semi-autonomous device can be programmed to follow the one or more boundaries until each boundary forms a closed shape or the semi-autonomous device moves beyond the operating area of the target environment. In some embodiments, the semi-autonomous device can utilize machine learning algorithms, e.g., neural networks, classifier algorithms, to identify paths in the target environment to map a larger portion of the target environment using fewer steps. The machine learning algorithms can be trained on data collected previously by the semi-autonomous device from other environments with the assistance of a human operator. The data can include the path taken by the semi-autonomous device and the shape and size of boundaries encountered by the semi-autonomous device.

Once the target environment has been sufficiently recorded by the semi-autonomous device in 210, the recorded map of the target environment can then be transferred from the semi-autonomous device to the analysis system in 220. In some embodiments, the recorded map of the target environment can be transferred from the semi-autonomous device to the analysis system only after the semi-autonomous device records a substantially complete map of the target environment. This approach can be useful for environments where the semi-autonomous device cannot be operably coupled to the analysis system during the mapping process 210. For example, in embodiments where data is transferred via Bluetooth, the semi-autonomous device may move beyond the operating range of Bluetooth in larger environments.

In some embodiments, the process of transferring the map of the target environment 210 and the process of mapping the target environment with the semi-autonomous device 220 can occur simultaneously. For example, as the semi-autonomous device moves through the target environment, data recorded by the sensors can be transferred to the analysis system. For example, this approach can be implemented in environments where the semi-autonomous device and the analysis system can transfer data via a wireless network. This approach can reduce the time to transfer data between the semi-autonomous device and the analysis system. This approach can also enable the analysis system to generate and update portions of the virtual environment as the semi-autonomous device is actively mapping the target environment.

Once the analysis system receives the recorded map of the target environment, the analysis system can then use the recorded map to generate a virtual representation of the target environment in 230. The virtual environment can be a two-dimensional (2D) or a three-dimensional (3D) representation of the target environment. In some embodiments, simultaneous localization and mapping (SLAM) techniques developed for semi-autonomous and autonomous devices can be used to construct the virtual environment. Such techniques can incorporate the recorded map of the target environment (e.g., the locations of boundaries detected by the semi-autonomous device), data recorded by the localization system (e.g., odometry data, laser map alignment data), and kinematic modeling of the semi-autonomous device to improve the accuracy of the virtual environment with respect to the physical environment. In some embodiments, the SLAM techniques can also be used to identify dynamic obstacles, such as a person walking through the environment. Dynamic obstacles can be excluded in the virtual environment in order to generate a more idealized version of the target environment. The more idealized virtual environment can be used to teach more generally applicable action sequences. In some embodiments, the virtual environment can also be edited manually by a human operator.

In some embodiments, the process of constructing the virtual environment in 230 can be accomplished by a dedicated processor in the analysis system. In particular, SLAM techniques can be computationally expensive; hence, the dedicated processor can be configured to have greater processing power to reduce the amount of time to construct the virtual environment. A separate, less powerful processor can be used when the human operator is teaching the virtual device via the user interface. In some embodiments, the process of constructing the virtual environment can be iterative and can involve the human operator visually inspecting the mapped target environment to ensure the virtual environment is an accurate representation of the target environment. For example, the process of constructing the virtual environment 230 can be sufficiently robust such that one or more portions of the virtual environment can be replaced if the one or more portions have errors or are insufficiently recorded during the mapping process 210.

Once the virtual environment has been constructed, the human operator can then interact and guide a virtual representation of the semi-autonomous device in the virtual environment using the user interface in 240. In some embodiments, the virtual device can be a simplified model of the semi-autonomous device with a similar form factor and dimensions. The virtual teaching system can include a physical model to simulate the interaction of the virtual device with the virtual environment. For example, the physical model can detect when the virtual device collides with a boundary in the virtual environment. In another example, the physical model can simulate the effects of different surface properties, e.g., carpet, hardwood, concrete, on the movement of the virtual device. A kinematics model can also be included to simulate the motion and control of the virtual device. The kinematics model can include the localization and trajectory planning systems used by the semi-autonomous device with emulated inputs and sensory feedback. In this manner, the process of piloting the virtual device through the virtual environment can be substantially similar to piloting the semi-autonomous device through the target environment.

The virtual teaching system can provide the human operator multiple tools to augment the process of teaching the virtual device an action sequence. For example, the human operator can record the action sequence as one or more segments, which are then replicated and/or stitched together. In another example, any portions of the action sequence can be edited or replaced by the human operator. The virtual device can be instantaneously moved to different positions along the action sequence when editing a portion of the action sequence. In conventional methods, the semi-autonomous device would be moved to the different positions in the action sequence, which can be more time consuming and labor intensive. The action sequence can be paused, rewound, or played at various speeds (e.g., 0.5×, 1×, and 2×) than is physically possible with the semi-autonomous device. For example, a portion of the action sequence can be played at slower speeds to better identify the cause of an error or an undesirable behavior from the virtual device. In another example, portions of the action sequence can be played at faster speeds when testing the action sequence for errors or undesirable behavior. In some embodiments, portions of the action sequence can be skipped entirely if previously tested. The action sequence can also be saved and stored for subsequent editing or deployment on the analysis system.

The user interface can also enable the human operator to incorporate heuristic data to augment the process of teaching the virtual device the action sequence. For example, the human operator can define safety margins in the virtual environment to ensure the virtual device operates in a safe manner where possible collisions and/or damage to the semi-autonomous device or the target environment is reduced. The user interface can also provide different views of the virtual device in the virtual environment. For example, a view from the perspective of the virtual device can be used to emulate the perspective a human operator has when physically piloting the semi-autonomous device. In another example, a top down view can be used to provide the human operator a better view of the virtual environment. In some embodiments, one or more recorded action sequences can be displayed to the human operator via the user interface to facilitate selection of action sequences that provide more desirable performance and/or behavior from the semi-autonomous device.

Once a desired action sequence is recorded in the virtual environment in 240, the virtual teaching system can then transfer the recorded action sequence from the analysis system to the semi-autonomous device for execution in the target environment in 250. In this manner, the virtual teaching system described herein can teach a semi-autonomous device to perform an action sequence using less time in the target environment and without needing the human operator to be physically present in the target environment. Additionally, the virtual teaching system can provide the human operator multiple tools to record, rerecord, edit, and/or test an action sequence to enable faster creation of the action sequence and improving ease of use.

Figure 3:
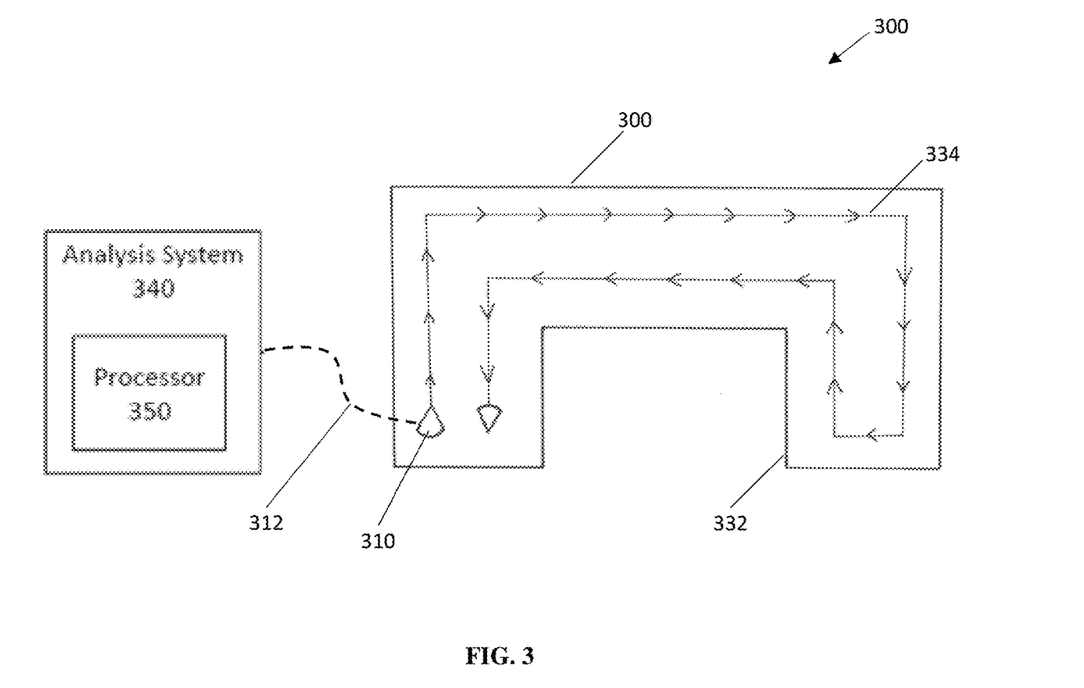
FIG. 3 is an illustration showing a semi-autonomous device recording a map of a target environment using a virtual teaching system, according to an embodiment.
Figure 4:
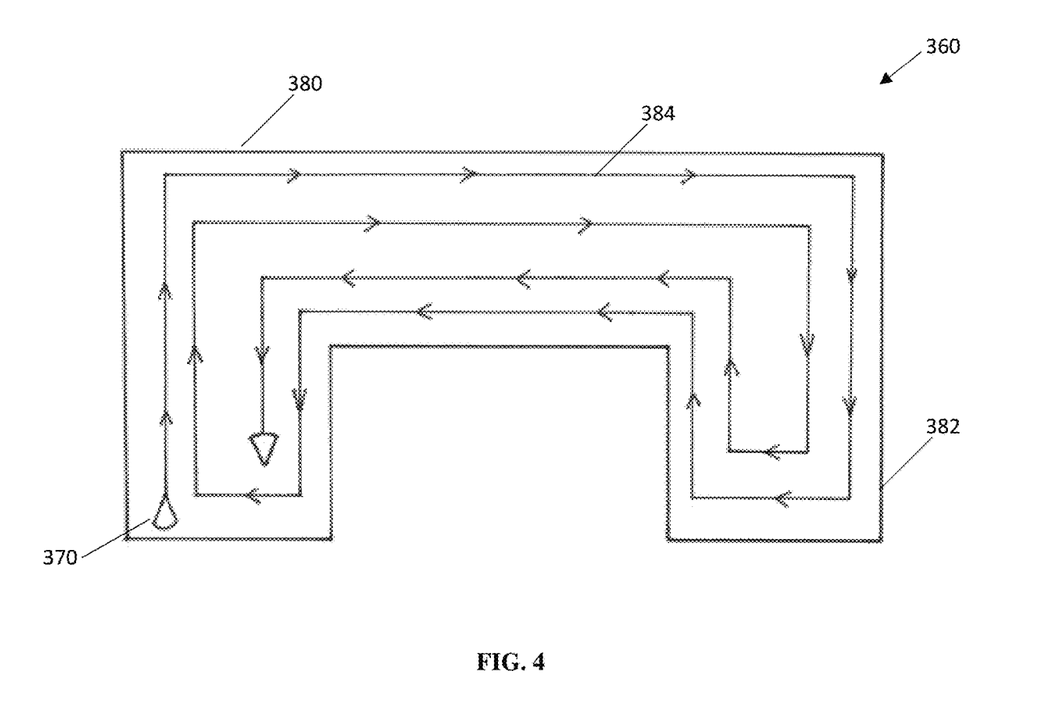
FIG. 4 is an illustration showing a virtual device being taught an action sequence in a virtual environment using the virtual teaching system in FIG. 3.

FIGS. 3-4 show an exemplary embodiment of a virtual teaching system 300 used to teach a semi-autonomous device 310 (e.g., a floor cleaning robot) to navigate through a target environment 330. FIG. 3 shows an exemplary illustration of the semi-autonomous device 310 recording a map of the target environment 330 to be used in the construction of a virtual environment 380. As shown, the target environment 330 can include one or more boundaries 332 forming an enclosed environment. The semi-autonomous device 310 can be guided through the target environment 330 following a physical path 334 defined by a human operator. As described above, the process of mapping the target environment 330 can be simpler than physically teaching the semi-autonomous device 310 an action sequence in the target environment 330. For example, as illustrated in FIG. 3, the semi-autonomous device 310 can be guided through a portion of the target environment 330 that follow the boundaries 332. Once the semi-autonomous device 310 sufficiently maps the target environment 330, the recorded map can then be transferred to an analysis system 340 via a data transfer system 312. The analysis system 340 can include a processor 350 used, at least in part, to construct the virtual environment 380.

FIG. 4 shows an exemplary illustration of the virtual environment 380 constructed from the target environment 330 and displayed via a user interface 360. The virtual environment 380 can include boundaries 332 representative of the boundaries 332 in the target environment 330. The human operator can thus use the virtual device 370 in the virtual environment 380 to create a desired action sequence that would enable the semi-autonomous device 310 to sufficiently perform a task, e.g., cleaning the floor of the target environment by following a desired virtual path 384. As shown, the virtual path 384 can be created by piloting the virtual device 370 through the virtual environment 380. By using the virtual environment 380, more complex virtual paths 384 can be created more quickly and without the human operator having to be physically present in the target environment 330. Once the desired virtual path 384 is recorded, the analysis system 340 can transfer the recorded virtual path 384 to the semi-autonomous device 310. The semi-autonomous device 310 can then follow the virtual path 384 during operation.

Figure 5:
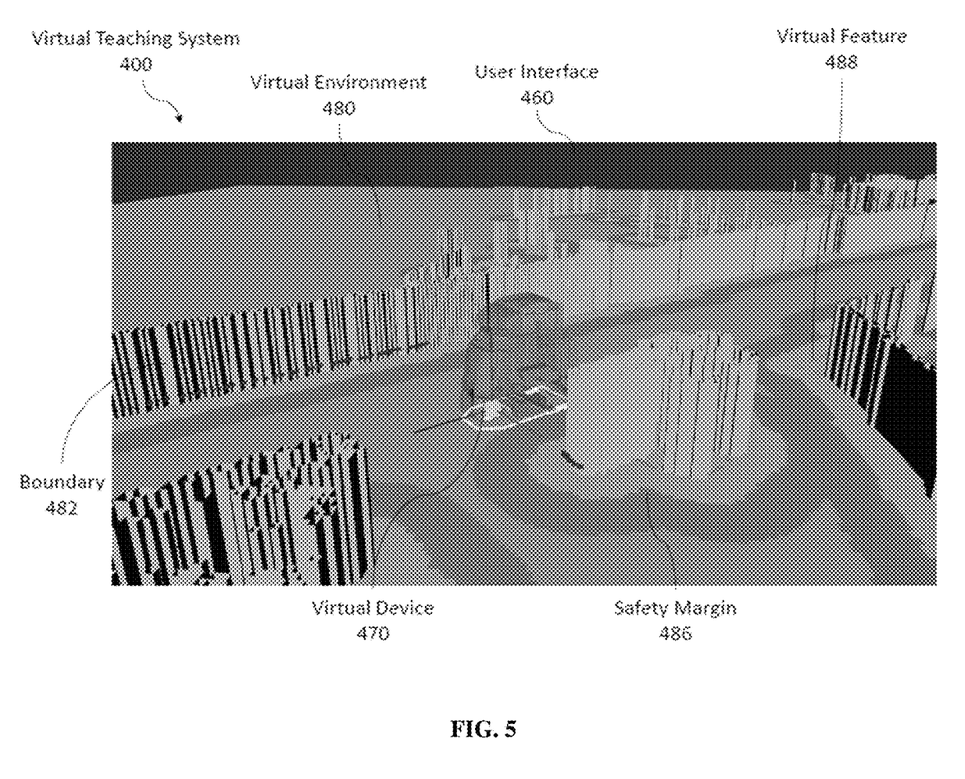
FIG. 5 is a perspective view of a virtual device in a virtual environment using a virtual teaching system, according to an embodiment.
Figure 6:
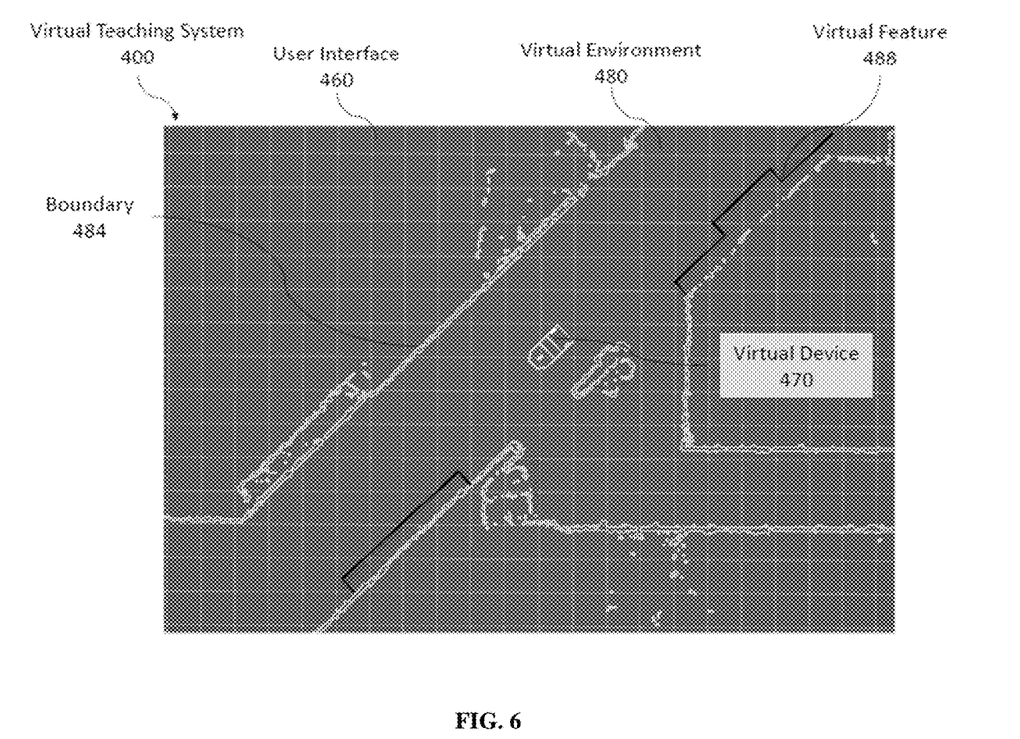
FIG. 6 is a top view of the virtual device and the virtual environment in FIG. 5.

FIGS. 5-6 show an exemplary embodiment of a virtual teaching system 400 used to teach a semi-autonomous device (e.g., a floor cleaning robot). As shown in FIG. 5, the virtual teaching system 400 can construct a three-dimensional representation of a virtual environment 480 with a plurality of boundaries 482 displayed using a user interface 460. The user interface 460 can be used to drive a virtual device 470 through the virtual environment 480, emulating the teaching process conventionally used when a human operator physically pilots a semi-autonomous device through a target environment. The virtual device 470 can be disposed in the virtual environment 480 with a similar form factor and dimensions to the corresponding semi-autonomous device. The user interface 460 can also enable the human operator to define one or more safety margins 486. As shown in FIG. 5, the safety margins 486 can be located proximate to the boundaries 482 to reduce the likelihood of the semi-autonomous device colliding with the boundaries in the target environment. Additionally, virtual features 488 can be manually added to the virtual environment. In some embodiments, the virtual features 488, as shown in FIG. 5, can be used to limit the operating area of the semi-autonomous device. The user interface 460 can also provide the human operator multiple views of the virtual device 470 and the virtual environment 480. For example, FIG. 6 shows a top-down view of the virtual device 470 and the virtual environment 480 from FIG. 6, which can be used to evaluate recorded action sequences in relation to the various boundaries 482 in the virtual environment 480.

Figure 7:
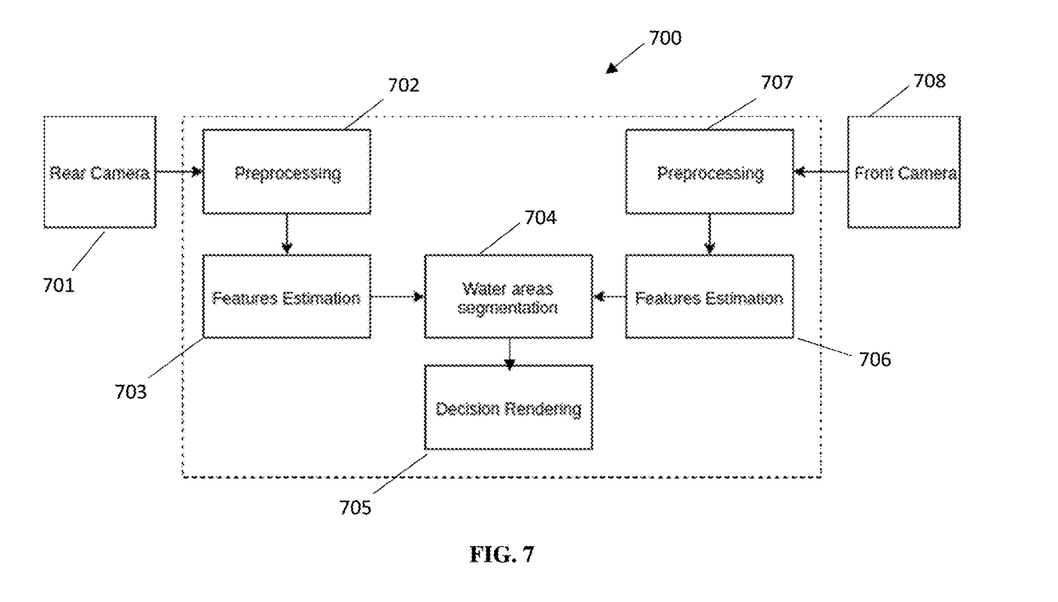
FIG. 7 is a block diagram showing the interconnection of the functional modules used for visual streak detection by the floor scrubber.

FIG. 7 is a block diagram showing the interconnection of the functional modules used by the floor scrubber. The block diagram 700 of FIG. 7 includes a Front Camera 708 that is mounted on the front of the floor scrubber, generally pointing in the direction of travel for the floor scrubber. The Front Camera 708 feeds the continuous image to the Preprocessing unit 707, which filters and transforms the image to a reference image. The Preprocessing Unit 707 applies image processing filters on the input image to remove noise, reduce size or transform to another space. These operations can be done with OpenCV or with other similar software libraries. The preprocessor outputs video data to the Features Estimation unit 706. The Features Estimation Unit 706 extracts edge, color and texture features from the preprocessed image. These operations could be done with OpenCV libraries or coded using algorithms found in well-known image processing literature.

Furthermore, system 700 also has a Rear Camera 701, that is mounted on the rear of the floor scrubber, generally pointing opposite the direction of travel for the floor scrubber. The Rear Camera 701 feeds the continuous image to the Preprocessing unit 702, which filters and transforms the image to an image of interest. As is known in image processing technology, the continuous image stream may be sampled periodically to provide a series of static images for use in further image processing. The Preprocessing Unit 702 applies image processing filters on the input image to remove noise, reduce size or transform to another space. The two image streams coming from Features Estimation unit 706 and Features Estimation unit 703 are compared in Water Areas Segmentation unit 704. The Water Areas Segmentation Unit 704 examines the generated edge, color and texture features from both rear and front cameras and provides a likelihood for different image areas to be covered with water. A learning-based mechanism such as Support Vector Machine (SVM) can be used. In addition, and not shown, would be a comparison delay equivalent to the transit time for floor scrubber between the two cameras, so that the comparison is on the same area of the floor, pre and post cleaning. The Decision Rendering unit 705, takes the output of the Water Areas Segmentation unit 704 and decides on the presence of water patches and generate appropriate notifications.

Figure 8:
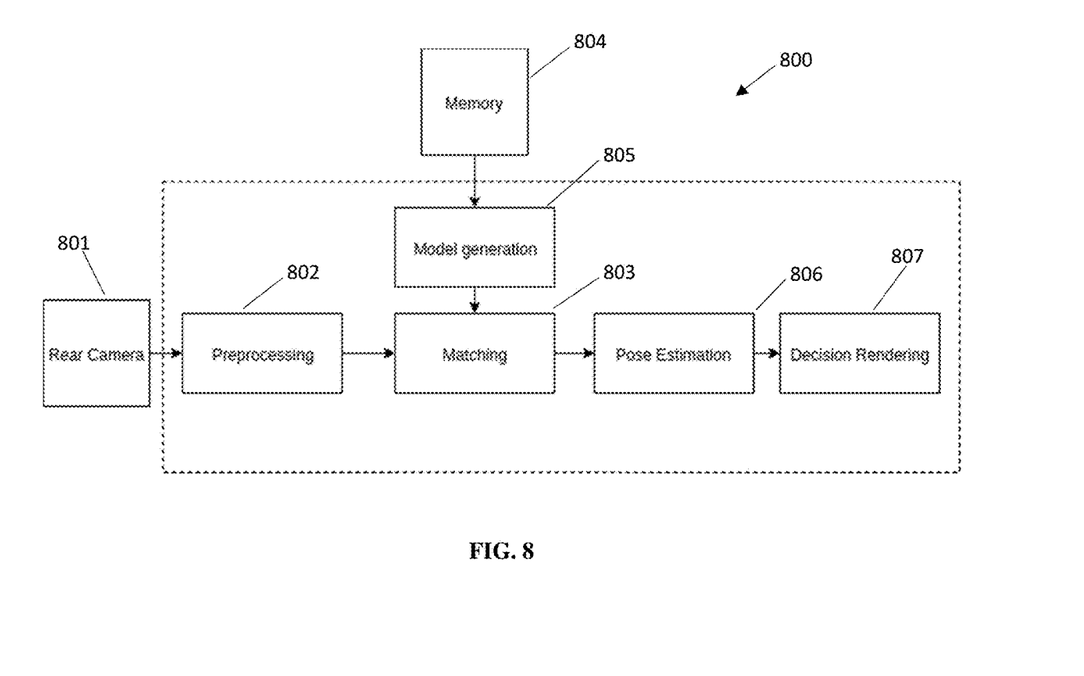
FIG. 8 shows a system block diagram for a detection algorithm.

FIG. 8 shows a system block diagram for monitoring one or more consumables. The block diagram 700 of FIG. 8 includes a Rear Camera 801 that sends continuous video output to Preprocessing unit 802. Preprocessing unit 802 provides discrete features extraction and/or applies image processing filters on the input image to remove noise, reduce size or transform to another space. These operations could be done with OpenCV or with similar software libraries. The output of the Preprocessing unit 802 is fed into the Matching unit 803. The Memory 804 contains reference features encoded to facilitate easy comparison the features identified by the Rear Camera 801. The Memory 804 also contains information on where in the visual field the identified objects should be placed. The Memory 804 feeds into the Model Generation unit 805, that creates a model for comparison to the actual features and position observed by the Rear Camera 801. Model generation could be as simple as retrieving a template or a set of features from memory, or it could involve rotating, resizing or subdividing the template or model to match against different possible location and orientations of the squeegee in the image. These operations could be done with the help of standard computer vision or computer graphics libraries such as OpenCV and or OpenGL.

The Matching module 803, compares discrete features by comparing their descriptors which could be done using an algorithm like RANSAC for example which is also available in OpenCV, or by performing patch matching. This can be done with standard techniques available in open source libraries or coded following well known image processing algorithms. The output of the Matching unit 803 feeds into the Pose Extraction unit 806. Pose estimation uses the results of matching to generate a hypothesis (or hypotheses) about the pose of the squeegee in the image, including a confidence estimation. The Decision Rendering unit 807, utilizes the results of pose estimation to determine whether the squeegee or any of its visually identifiable (visually monitored) mechanical components such as squeegee, squeegee assembly, bolts, carrier, or idler wheels are in the correct position, misaligned, trailing behind the robot or totally absent and generate appropriate notifications and corrective actions. Identifying misplaced or misaligned components is particularly crucial for removable, replaceable, or disposable parts such as rear squeegee rubbers and idler wheels. While in this implementation, the camera position is advantageously directed to the rear of the device and towards the rear squeegee assembly, other implementations may benefit from cameras other positions, including at the underside, rear, front or side of the floor scrubber.

In another embodiment, the system compares the intensity gradients of a front facing camera with the gradient of a rear facing camera to account for baseline intensity gradients of the surface being cleaned. Some delay or hysteresis is added to the signaling algorithm, for situations where the intensity gradient of the surface being cleaned is changing due to different patterns in the surface.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters and configurations described herein are meant to be exemplary inventive features and that other equivalents to the specific inventive implementations described herein may be realized. It is, therefore, to be understood that the foregoing implementations are presented by way of example and that, within the scope of the appended claims and equivalents thereto, inventive implementations may be practiced otherwise than as specifically described and claimed. Inventive implementations of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

In some embodiments, the systems and/or methods described herein can be executed using any suitable compute device or system including, for example, the same computing facilities as the device application, which may include one or more of the same computer, processor, application-specific integrated circuits (ASICs), field programmable gate array (FPGA), etc. In other embodiments, the safety systems described herein can be executed using a first (e.g., primary) computer, processor, ASIC, FPGA, etc. while receiving input commands from a second (e.g., secondary) computer, processor, ASIC, FPGA, etc. through wireless or non-wireless, analog or digital channels. Any of the safety systems described herein can use a real time operating system or a sensor framework provided by other third party vendors including, but not limited to QNX and VxWorks.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A virtual teaching system, comprising:
   a semi-autonomous device to perform a task, the semi-autonomous device having one or more sensors to detect a plurality of boundaries in a target environment; and
   an analysis system, the analysis system having a processor, a memory, and a display, the processor configured to execute a set of instructions stored in the memory associated with constructing a virtual environment and a virtual device, the display configured to show a user interface, the user interface configured to enable a human operator to interact with the virtual environment and the virtual device; wherein once the virtual environment has been constructed, the human operator can then interact and guide a virtual representation of the semi-autonomous device in the virtual environment using the user interface; wherein the user interface enables the human operator to incorporate heuristic data to augment the process of teaching the virtual device the action sequence by defining safety margins in the virtual environment to ensure the virtual device operates in a safe manner where possible collisions or damage to the semi-autonomous device or the target environment is reduced.

2. The virtual teaching system of claim 1, wherein the user interface allows the human operator to drive the virtual device in the virtual environment.

3. The virtual teaching system of claim 2, wherein the user interface allows the human operator to record an action sequence.

4. The virtual teaching system of claim 3, wherein at least a portion of the action sequence can be rerecorded by the human operator.

5. The virtual teaching system of claim 3, wherein the action sequence can be played at variable speed.

6. The virtual teaching system of claim 3, wherein at least a portion of the action sequence is constrained by one or more safety margins in the virtual environment.

7. A method performed by an analysis system of teaching a semi-autonomous device, comprising the following steps:
   recording a map of a target environment using a semi-autonomous device;
   transferring the map of the target environment from the semi-autonomous device to an analysis system;
   constructing a virtual environment based on the map of the target environment;
   teaching a virtual device an action sequence in the virtual environment; and
   transferring the action sequence from the analysis system to the semi-autonomous device; wherein once the virtual environment has been constructed, the human operator can then interact and guide a virtual representation of the semi-autonomous device in the virtual environment using the user interface; wherein the user interface enables the human operator to incorporate heuristic data to augment the process of teaching the virtual device the action sequence by defining safety margins in the virtual environment to ensure the virtual device operates in a safe manner where possible collisions or damage to the semi-autonomous device or the target environment is reduced.

8. The method of claim 7 wherein the step of recording a map further comprises by using the one or more sensors disposed on the semi-autonomous device to detect and record the locations of walls, obstacles, sensors and environmental features.

9. The method of claim 8 wherein the sensors can be used to detect the locations of one or more boundaries in the target environment and the semi-autonomous device can be programmed to follow the one or more boundaries until each boundary forms a closed shape or the semi-autonomous device moves beyond the operating area of the target environment.

10. The method of claim 7 wherein the semi-autonomous device utilizes machine learning algorithms to identify paths in the target environment to map a larger portion of the target environment using fewer steps.

11. The method of claim 7 wherein the step of transferring the map of the target environment from the semi-autonomous device to an analysis system is only transferred after the semi-autonomous device records a substantially complete map of the target environment.

12. The method of claim 11 wherein the transfer of data is accomplished using Bluetooth.

13. The method of claim 7 wherein the steps of transferring the map of the target environment and the step of mapping the target environment with the semi-autonomous device can occur simultaneously using a wireless network.

14. The method of claim 13 further comprising the step of enabling the analysis system to generate and update portions of the virtual environment as the semi-autonomous device is actively mapping the target environment.

15. The method of claim 7 wherein once the analysis system receives the recorded map of the target environment, the analysis system uses the recorded map to generate a virtual environment of the target environment.

16. The method of claim 15 wherein the virtual environment comprises of a two-dimensional (2D) or a three-dimensional (3D) representation of the target environment.

17. The method of claim 15 wherein simultaneous localization and mapping (SLAM) techniques developed for semi-autonomous and autonomous devices can be used to construct the virtual environment.

18. The method of claim 15 wherein the process of constructing the virtual environment can be accomplished by a dedicated processor in the analysis system.

* * * * *